UNITED STATES PATENT OFFICE.

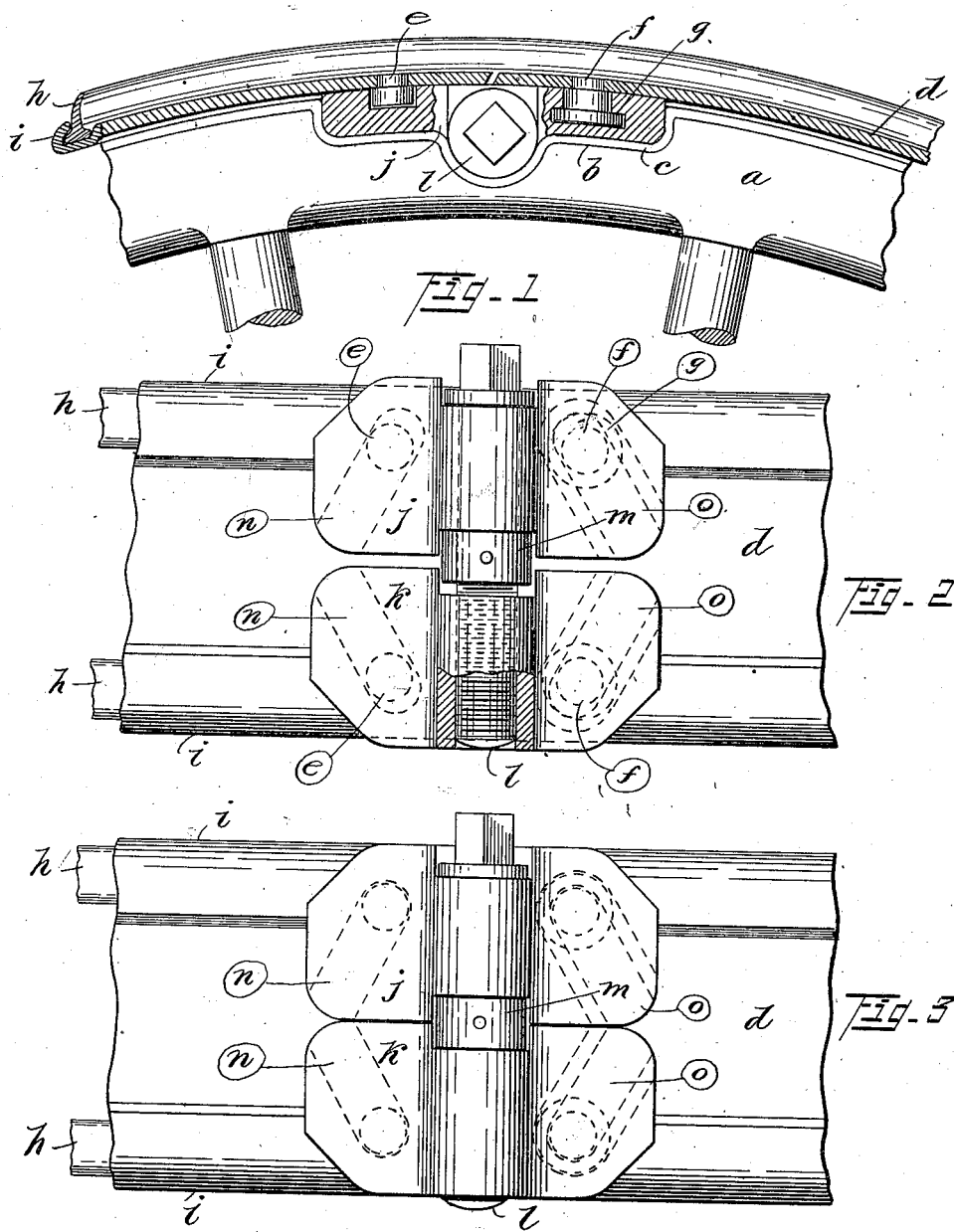

HORACE MOTE, OF DETROIT, MICHIGAN.

LOCKING MECHANISM FOR VEHICLE-WHEEL RIMS.

1,201,854. Specification of Letters Patent. Patented Oct. 17, 1916.

Application filed August 26, 1912. Serial No. 717,063.

*To all whom it may concern:*

Be it known that I, HORACE MOTE, a subject of the King of England, residing at Detroit, in the county of Wayne and State of Michigan, have invented certain new and useful Improvements in Locking Mechanism for Vehicle-Wheel Rims, of which the following is a specification.

My invention relates to improvements in locking mechanism for vehicle wheel rims, and has for its object the provision of means for expanding and contracting a split rim-member, whereby the detachable flanges of a demountable or other rim may be locked in position or released, and the rim-member itself may be secured in position upon the felly of the wheel.

Briefly describing the embodiment of my invention, the two ends of the split rim-member are provided preferably with two (2) depending pins or lugs interiorly thereof, with which two diagonally slotted members are adapted to engage, and under the influence of a screw, serve to expand and strongly contract said rim-member. One of the ends ordinarily is attached to the locking-mechanism, while the other is capable of being instantly released therefrom, when said mechanism is expanded. This construction is extremely simple, and is not liable to get out of order. Moreover, it is exceedingly compact and powerful in its action. In view of these structural features and advantages, the device is well adapted for the purpose named, and indeed may well find additional applications or uses.

I will explain my invention in more detail, by making reference to the accompanying drawings, wherein:—

Figure 1, is a fragmentary view of a vehicle wheel, equipped with my improvement; the demountable rim-member and locking-means being shown in section. Fig. 2, is an under-side fragmentary view of said rim-member, illustrating the locking mechanism in its open or expanded position, while Fig. 3, is a similar view, illustrating the closed position thereof. Fig. 4, is a perspective view of one of the diagonally slotted locking-members.

Throughout the several figures of the drawing, I have employed the same character of reference to indicate similar parts.

The felly $a$ of the wheel, is recessed at one portion $b$, and suitably strengthened thereat, as by the shaped section $c$ of the felly-band, partially occupying said recess. An interiorly channeled rim-member $d$ is adapted to fit snugly over the felly-band, as shown in cross section Fig. 1. The ends of said rim-member are split and opposing sets of pins $e, f$, are securely attached adjacent to each end; the latter being provided with flanged heads $g$ for a purpose to which I will revert.

Retaining rings $h\ h$, fragments of which are shown in the figures, are adapted to be mounted upon the rim-member $d$ for securing the pneumatic tire in place, after the manner well known in the art. These rings are normally retained in place by the lateral flanges or lips $i$ formed upon the rim-member. However, upon removing said rim-member from the felly, it will be appreciated that the split ends may be overlapped sufficiently to permit the ready release of the retaining rings and tire, normally mounted thereon.

For the purpose of suitably expanding and contracting the rim-member, I have provided the locking-mechanism, which will best be understood by referring to Fig. 2. This comprises two (2) laterally separable members $j, k$; the latter of which is tapped to receive the transverse screw $l$, extending through the central bore in member $k$, and the spacing sleeve $m$. The head of said screw is squared to receive a wrench or other tool for operating the locking-mechanism.

By referring to Fig. 4, which shows an inner perspective view of one of said locking-members, the details and operation will be best appreciated. Two diagonal converging slots, $n, o$, are shown therein, and indicated by dotted lines in other figures, as well. These are adapted respectively to engage with two of the pins $e, f$, adjacent to the split ends of the rim-member $d$. It will be observed that the pins $f$ have flanged heads $g$, which are adapted to lie within the undercut portions of the diagonal slots $o$, thereby holding the locking-mechanism in position upon the right hand portion of the split rim-member. The left hand slot $n'$, however, easily accommodates the pin $e$ so that the locking-mechanism may be readily disengaged therefrom, immediately after the rim is removed from the wheel.

Bearing in mind the construction just explained, the operation of my improved locking-mechanism requires only a few words of explanation. When the members $j$, $k$, are separated, as indicated in Fig. 2, the split ends of the rim-member $d$ are forced apart, by reason of the action of the duplicated diverging slots, upon their coacting pins. Tightening the screw, however, causes a powerful contraction of the split rim-member, by this same mechanism, so that the rim-member is seated firmly upon the wheel with its inner channel engaging the felly-band. This contraction, however, merely causes the flanged rings $h$ to be gripped or held by the upper portion of the rim-flanges $i$, whereby the tire and rings are held firmly in position upon the wheel.

While I have explained in detail the preferred construction or embodiment now used by me in practising my invention, I do not desire to be understood as limiting the same to the several details herein set forth, and I wish to secure by Letters Patent, the following:—

1. In a device of the class described, the combination with a split rim-member, of projecting lugs, provided adjacent to its split ends, a divergently slotted locking part, engaging said lugs, and a screw adapted to actuate said locking part, transversely of the rim-member, while in engagement with said lugs, whereby the rim-member may be expanded and contracted, substantially as set forth.

2. In a device of the class described, the combination with a transversely split annular member, of two opposing sets of lugs, provided adjacent to the ends thereof, two (2) divergently slotted locking-parts respectively bridging the split ends, and engaging said lugs within their diverging slots, and a screw uniting said slotted parts, and adapted to effect the transverse movement thereof against the lugs, whereby said split member may be expanded and contracted, substantially as set forth.

3. In a locking mechanism for vehicle wheel rims, the combination with a transversely split rim, of two sets of abutments respectively secured to the split ends of the rim, two (2) divergently slotted locking-parts, normally held in position by one set of abutments, and removably engaging the other set, and a transverse screw acting upon said parts to effect their movement with respect to said abutments, substantially as set forth.

4. The combination with a transversely split annular member, of pins or abutments respectively provided upon the ends, a locking member having relatively inclined or diverging slots respectively engaging said pins interiorly of its slots, and screw-mechanism adapted to effect the transverse movement of said locking-member against the said pins, substantially as set forth.

5. A vehicle wheel, comprising the wheel-member and a removable split annular rim-member shaped to engage the wheel peripherally, flanged retaining rings thereon, and locking mechanism associated with the split ends of said rim-member, comprising lugs provided upon said split ends, a divergently slotted member engaging said lugs, and a screw device adapted to actuate said member, and separate or approximate the ends of said rim-member, substantially as set forth.

6. A vehicle wheel, comprising the wheel-member and its felly, of a removable split annular rim-member shaped to engage said wheel, flanged retaining rings thereon, and locking mechanism associated with the split ends of said rim-member, comprising two sets of opposing lugs, positioned adjacent to the ends of said rim-member, two divergently slotted parts respectively engaging two opposing lugs, and a screw acting upon said slotted parts and adapted to contract and expand said rim-member, substantially as set forth.

7. In a device of the class described, the combination with a transversely split annular tire-mounting member, of locking mechanism therefor, comprising divergently slotted parts provided adjacent to the ends of said split member, relatively fixed abutments respectively engaging said slots and means for effecting the relative transverse movement of said parts and abutments for contracting and expanding said split annular member, substantially as set forth.

In testimony whereof I do now affix my signature in presence of two witnesses.

HORACE MOTE.

Witnesses:
E. NICKELS,
ALBERT LYNN LAWRENCE.